US012766568B2

(12) United States Patent
Chondrokostas et al.

(10) Patent No.: US 12,766,568 B2
(45) Date of Patent: Oct. 20, 2026

(54) LANCE OF A CLEANING KIT FOR MEDIUM-VOLTAGE POWER DEVICES

(71) Applicant: 3N SOLUTIONS SPÓŁKA Z OGRANICZONĄ ODPOWIEDZIALNOŚCIĄ, Warsaw (PL)

(72) Inventors: Piotr Chondrokostas, Stare Babice (PL); Marek Obrębski, Warsaw (PL)

(73) Assignee: 3N SOLUTIONS SPOLKA Z OGRANICZONA ODPOWIEDZIALNOSCIA, Warsaw (PL)

( * ) Notice: Subject to any disclaimer, the term of this patent is extended or adjusted under 35 U.S.C. 154(b) by 424 days.

(21) Appl. No.: 18/483,718

(22) Filed: Oct. 10, 2023

(65) Prior Publication Data

US 2024/0123473 A1 Apr. 18, 2024

(51) Int. Cl.
*B08B 5/02* (2006.01)
*B08B 9/032* (2006.01)

(52) U.S. Cl.
CPC .............. *B08B 5/02* (2013.01); *B08B 9/0328* (2013.01); *B08B 2205/00* (2013.01)

(58) Field of Classification Search
None
See application file for complete search history.

(56) References Cited

U.S. PATENT DOCUMENTS 2,551,538 A * 5/1951 Hensel .................... B05B 7/065 261/76
3,587,967 A * 6/1971 Badger ..................... B05B 5/03 239/427.3
4,220,170 A 9/1980 Hebert et al.
4,841,999 A 6/1989 Danko
6,176,437 B1 * 1/2001 Pedersen ................... B08B 5/02 239/570
6,698,672 B1 * 3/2004 Linkletter ............... B05B 1/005 239/281
11,554,391 B1 * 1/2023 King .................. B01D 46/4227
2003/0066905 A1 * 4/2003 Huffman ............... B05B 7/1673 239/296
2009/0101183 A1 * 4/2009 Kim .......................... B08B 3/02 134/106

(Continued)

FOREIGN PATENT DOCUMENTS

CN 102202742 B * 11/2012 ............. B05B 12/18
WO WO-2013060794 A1 * 5/2013 ............... B08B 5/02
WO WO-2019040786 A2 * 2/2019 ........... B05B 7/1633

OTHER PUBLICATIONS

Search Report issued in Polish Patent Application No. P.442523, issued Mar. 13, 2023.

*Primary Examiner* — Omair Chaudhri
(74) *Attorney, Agent, or Firm* — McBee, Moore & Vanik IP, LLC

(57) ABSTRACT

The invention solves the problem of the construction of a lance of a cleaning kit for medium-voltage power devices. The lance is equipped with an external assembly (A) and an internal assembly (B) placed therein, wherein the external assembly (A) constitutes a head (1) with clamps (2) and (3) of connections, mounted in it from the front, and connected to a body (4). The body (4) is detachably connected to an extension (5), which at the opposite end is detachably connected to a dispensing nozzle (6).

6 Claims, 5 Drawing Sheets

(56) References Cited

U.S. PATENT DOCUMENTS

| | | | | |
|---|---|---|---|---|
| 2013/0200173 | A1* | 8/2013 | Wolfgram | B05B 1/02 239/11 |
| 2013/0341917 | A1* | 12/2013 | Lehmann | F16L 37/248 285/402 |
| 2015/0129171 | A1 | 5/2015 | Kipp | |
| 2016/0332175 | A1* | 11/2016 | Fu | B08B 3/028 |
| 2019/0159645 | A1* | 5/2019 | Hilaire | B08B 3/028 |
| 2022/0233045 | A1* | 7/2022 | Karren | C02F 1/4618 |
| 2022/0401970 | A1* | 12/2022 | Ciavarella | B05B 7/0087 |
| 2023/0173516 | A1* | 6/2023 | Son | B05B 7/068 239/424 |
| 2024/0375140 | A1* | 11/2024 | Kang | B05B 1/28 |

* cited by examiner

LANCE OF A CLEANING KIT FOR MEDIUM-VOLTAGE POWER DEVICES

CROSS-REFERENCE TO RELATED APPLICATIONS

This application claims priority to Polish Patent Application No. P.442253, filed 13 Oct. 2022, the entire contents of which are incorporated herein by reference.

BACKGROUND

Field

The subject of the invention is a lance of a cleaning kit for medium-voltage power devices during cleaning process.

The solution enables cleaning, mainly of power devices. It can also be used to clean other types of installations.

Description of Related Art

From the description of the Polish invention, protected by patent No. PL238 851, there is known a method and device for cleaning transmission channels and cooling channels of all types of devices, machines, tools, especially punches and forming dies, in which the channels are cleaned by dynamic, two-directional pulsation of the cleaning fluid in the channel being cleaned, using a cleaning arrangement with a modified double-membrane pump, connected to the cleaning arrangement in such a way that one section—the pump membrane is plugged in the arrangement on the supply side. The second membrane on the return side, which, after connecting the pump to a source of compressed air and cutting off the cleaned arrangement with a shut-off valve from the fluid tank and the supply pump, through alternating, pulsating vibrations of the membranes, introduces the cleaning fluid in the channel into a state of two-directional, dynamic pulsation and gives it a turbulent movement, thereby dynamizing the cleaning process.

SUMMARY OF THE INVENTION

The present invention makes it possible to solve a similar technical problem, but due to the fact that it is carried out with the use of fluids, it is not suitable for use in electrical power installations operating under voltage.

The purpose of the solution, according to the invention, is to eliminate the existing disadvantages by developing the construction of a device enabling the cleaning process of industrial devices, mainly power installations, without the need to disconnect and immobilize them for the time of carrying out cleaning works.

The implementation of the invention is about developing a solution enabling the achievement of the objective goals, which is the removal of impurities from devices operating under medium voltage.

The essence of the invention is the construction of a lance, which is an essential component of a cleaning kit for energized power devices. The lance, thanks to the technical means used and the use of suitable raw materials with dielectric properties, allows to carry out the cleaning process of the installation without the necessary to shut it down for the duration of the work. As a result, electrical power devices, despite the work being carried out, can work without interference and perform their functions properly.

According to the invention, the lance of the cleaning kit for medium-voltage power devices is equipped with an external assembly and an internal assembly located therein.

The external lance assembly of the cleaning kit, according to the solution, is a head with clamps of technical gas connections mounted in it from the front, connected to a body, detachably connected to an extension, which at the opposite end is connected to a dispensing nozzle.

A flow channel for an anti-frosting gas is formed within the external assembly and is connected to the anti-frosting gas connection clamp.

The internal assembly is a sleeve mounted axially in the body. It is a channel for the flow of the cleaning gas. The sleeve is connected to the cleaning gas connection clamp.

The head has the form of a solid of revolution which central part forms a cylinder with diagonally cut walls, adhering on both sides, the wall from the side of the connection clamp is stepped, converging towards the surface on which they are installed.

The head is connected to the body formed by a tube with an internal assembly sleeve axially mounted therein and connected to the cleaning gas connection clamp. The sleeve of the internal assembly in the cylindrical part of the head is shaped in the form of a bulb, inside which an openwork baffle is fixed transversely. This baffle acts as a mechanical filter to retain impurities from the gas flowing from the cleaning gas connection.

The sleeve of the external assembly, at the end, from the connection side of the extension, has a threading on the inside, matching the threading on the outer surface of the tip of the extension. These threadings cooperating with each other create a tight coupling between the extension and the body, secured from the outside with a “press-fit” fastening of the outer wall of the extension on the body, wherein the tube of the body is recessed at the place of attachment.

Above this recess, there is a ring covered with a flange. The same solution of the connection is placed on the opposite side, creating couplings between the extension and the dispensing nozzle.

The dispensing nozzle, depending on the needs, capacities and operational requirements, is connected to the extension.

The dispensing nozzle, in its initial section, near the extension, has the form of a sleeve, which at a certain distance from the place of connection with the extension turns into a flattened solid with side walls diagonally diverging to the sides, open at the end.

Inside the dispensing nozzle there is a sleeve which constitutes a continuation of the cleaning gas flow channel, converging to the narrowing towards point C, and then widening to the sides, so that its side walls are located parallel to the flared side walls of the dispensing nozzle. The walls of the dispensing nozzle and the axially located cleaning gas channel therein, wherein the walls extend perpendicularly to the flared side walls, form, in cross-section, closed circuits of the cleaning gas channel in the center, surrounded by the anti-frost gas flow channel. Keeping the walls of these channels at a constant distance from each other is ensured by fastening ribs mounted between them.

An element of the lance equipment is a protective cover, preferably transparent, mounted on the tube of the body, pressed against the flange and fixed with a nut.

The lance, according to the solution, is light and comfortable to use. Thanks to the appropriate shape and use of the extension, its length can be freely adjusted, adapting to the existing conditions. This makes it possible to clean places and surfaces previously inaccessible. The use of forced gas flow reduces the formation of thermal bridges and, as a result, eliminates frosting.

BRIEF DESCRIPTION OF THE DRAWINGS

The subject of the invention has been illustrated in the attached drawing, in which.

DETAILED DESCRIPTION OF A PREFERRED EMBODIMENT

Figure 1:
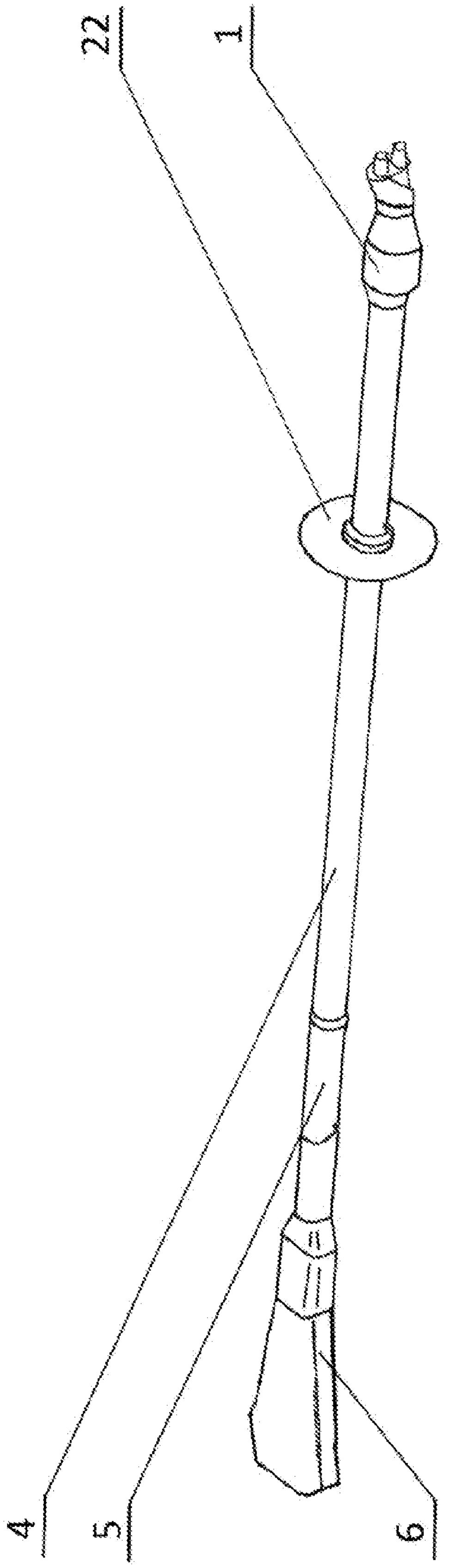
FIG. 1 shows a general view of the lance, example 1.
Figure 2:
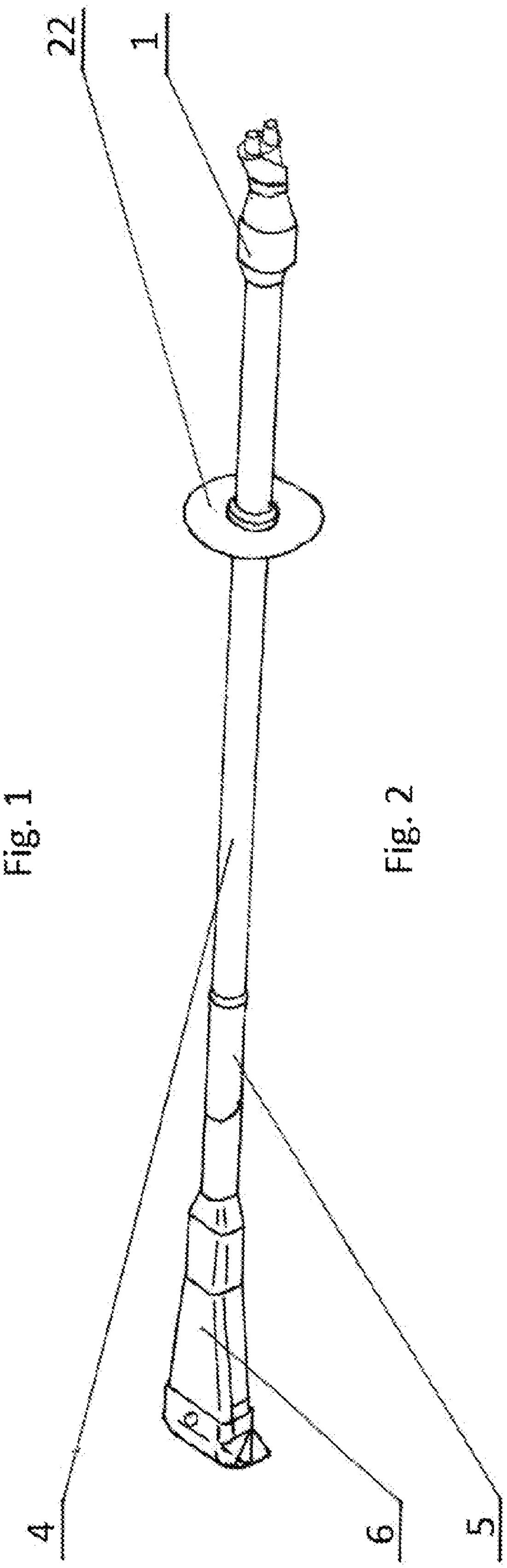
FIG. 2 shows a general view of the lance, example 2.
Figure 3:
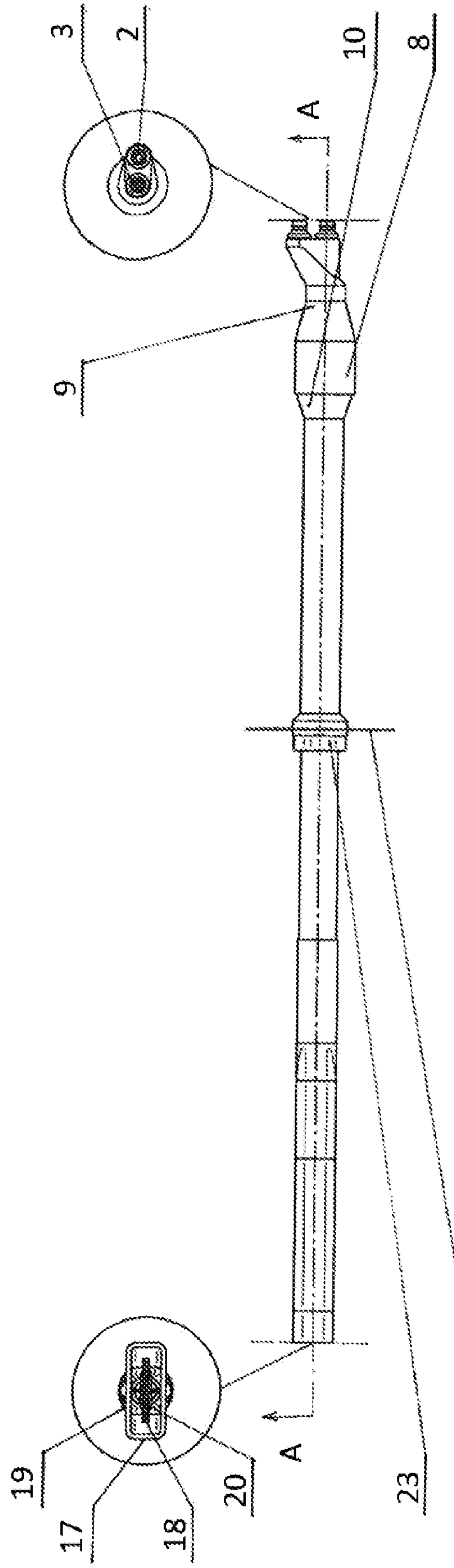
FIG. 3 shows a top view of the lance with the cleaning gas and anti-frosting flow clamps shown along with details presenting the views from the side of the clamps and the side of the dispensing nozzle, example 1.
Figure 4:
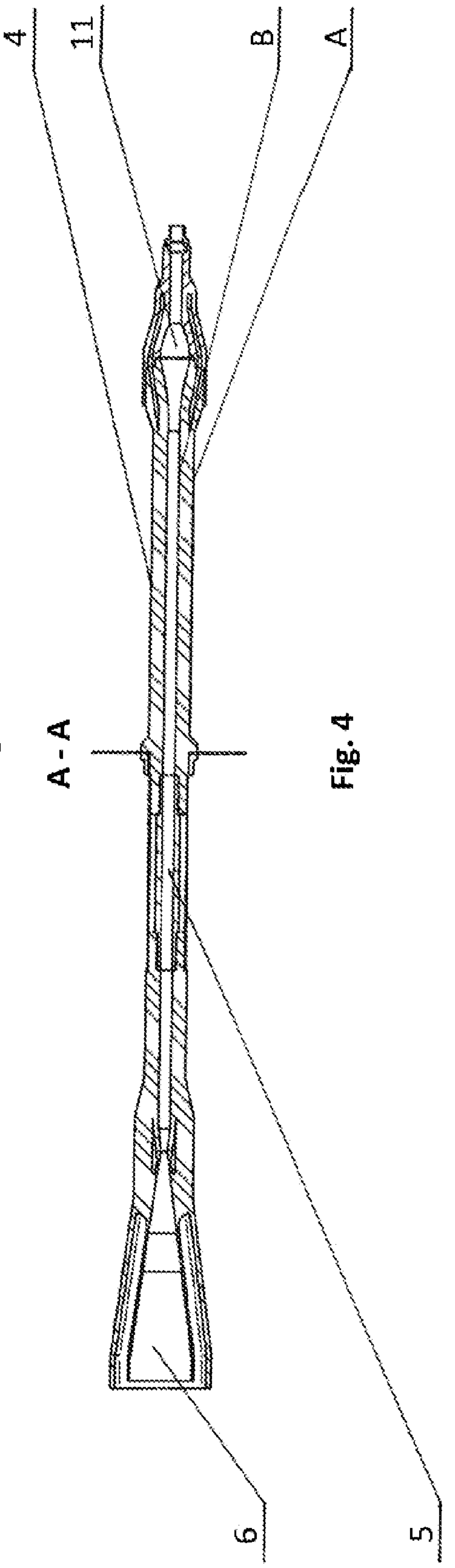
FIG. 4 shows the lance in A-A section along with the coupling to the cleaning gas clamp, example 1.
Figure 5:
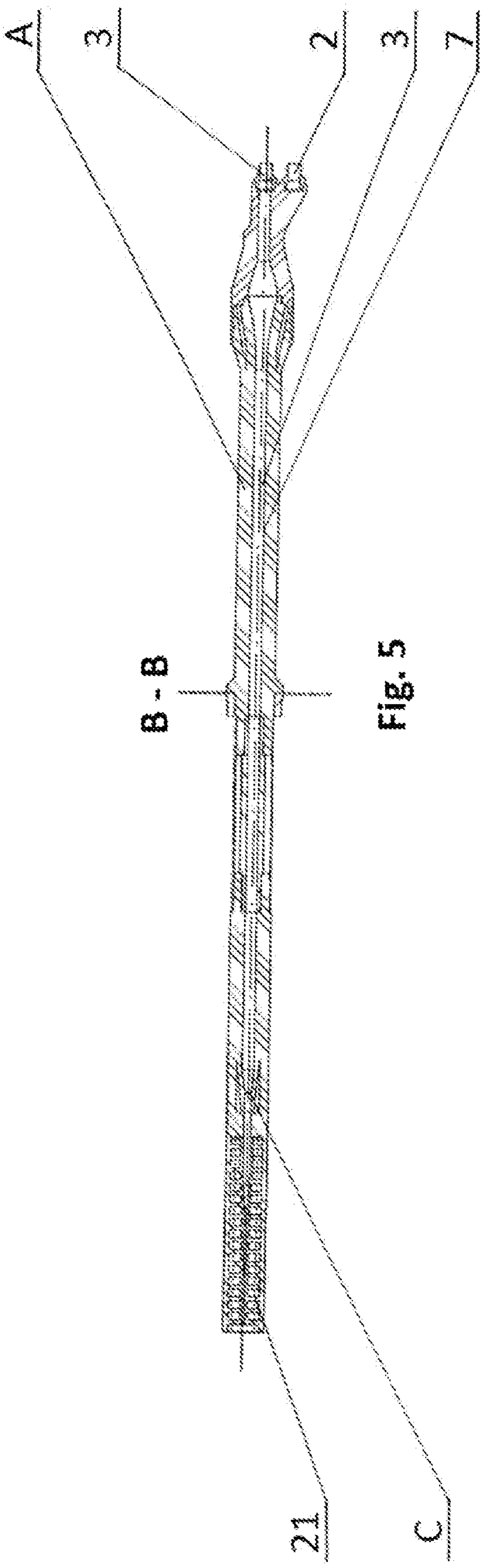
FIG. 5 shows the lance in B-B section along with the gas clamps, example 1.
Figure 6:
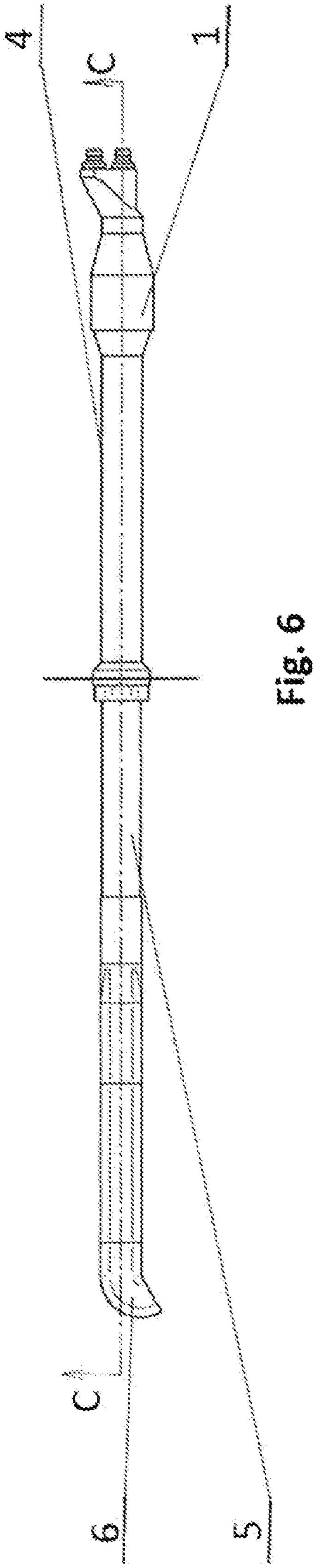
FIG. 6 shows a side view of is the lance, example 2.
Figure 7:
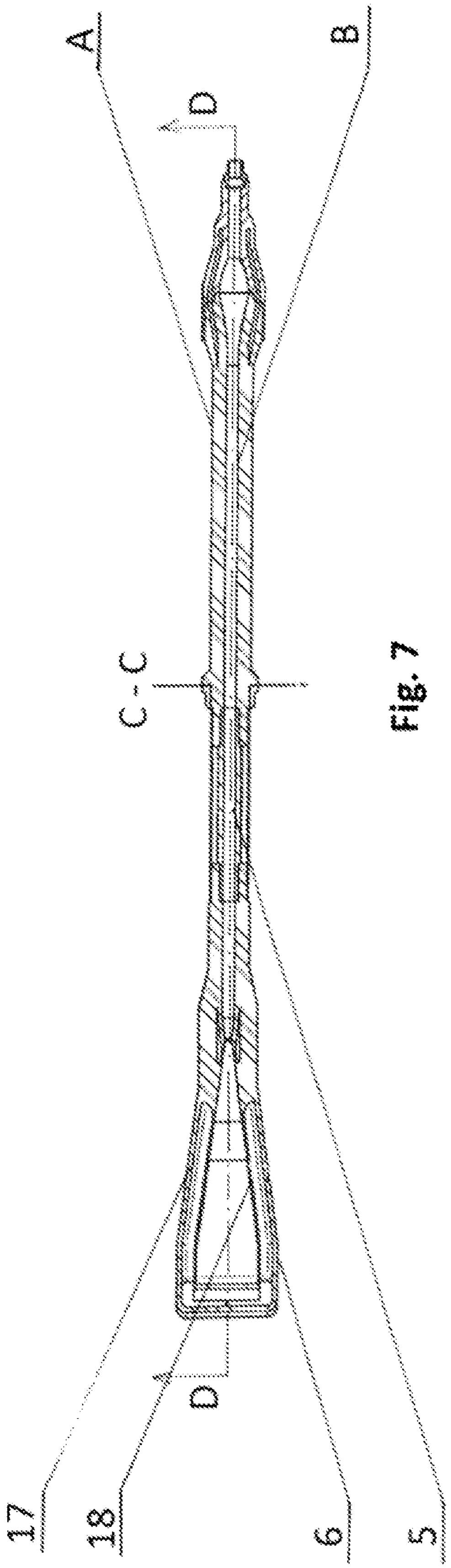
FIG. 7 shows the lance in C-C section, example 2.
Figure 8:
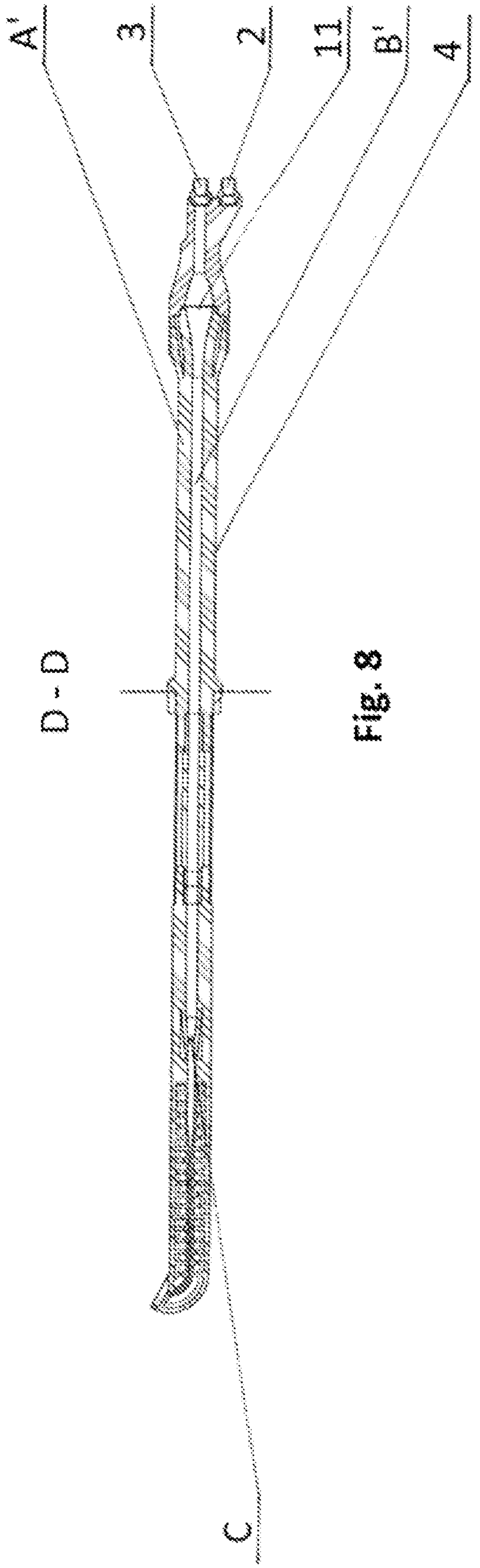
FIG. 8 shows the lance in D-D section, example 2.
Figure 9:
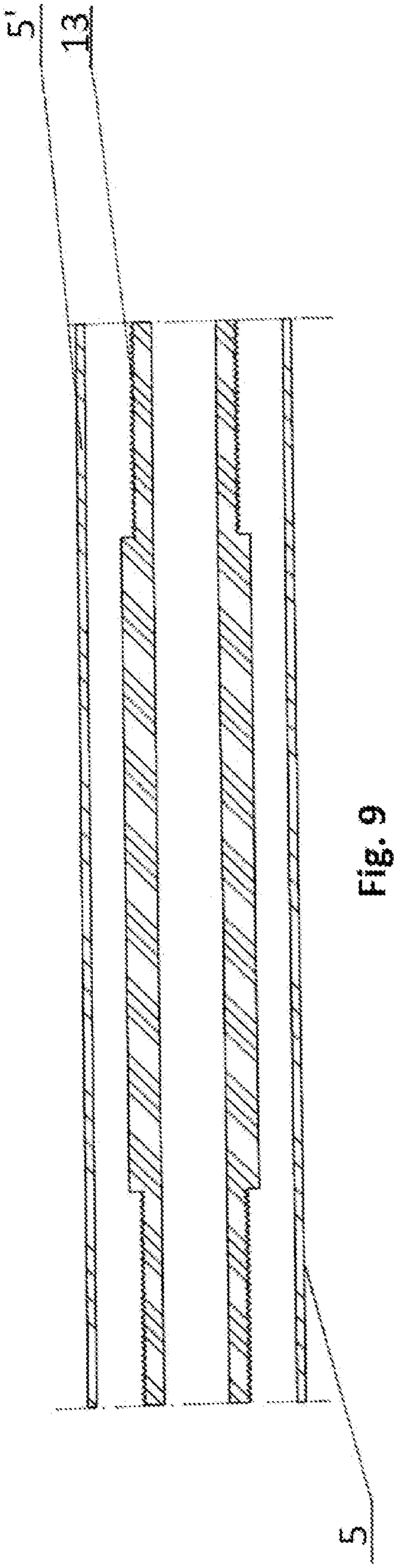
FIG. 9 illustrates the extension in cross section.
Figure 10:
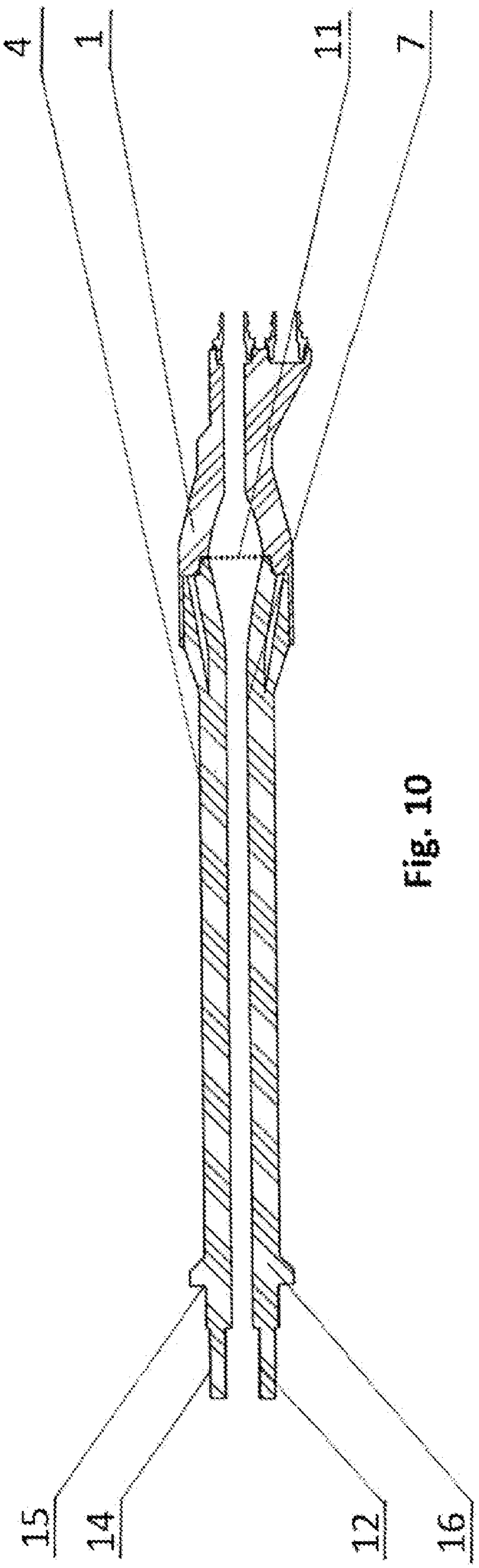
FIG. 10 shows the body in cross-section.

The lance of the cleaning kit for medium-voltage power devices is an essential element of the kit equipment.

The lance, example 1, made of a dielectric material, is provided with an external assembly A and an internal assembly B placed therein.

The external lance assembly A of the cleaning kit for medium-voltage power devices, according to the solution, is a head 1 with clamps 2 and 3 of gas connections mounted in it from the front, connected to a body 4, which is detachably connected to an extension 5, which at the opposite end is detachably connected to a dispensing nozzle 6.

The clamp 2 is connected to the anti-frosting gas connection, while clamp 3 is connected to the cleaning gas connection.

A flow channel for an anti-frosting gas A' is formed within the external assembly A, and is connected to the anti-frosting gas connection clamp 2, while a sleeve 7, located axially in the body 4, is a cleaning gas flow channel B' and is connected to the cleaning gas clamp 3.

The head 1 has the form of a solid of revolutions, which central part forms a cylinder 8 with diagonally cut walls 9 and 10, adhering to it at both ends, and the wall 9, from the side of the clamps 2 and 3, is stepped, converging towards the surface on which the clamps 2 and 3 of the connections are installed.

The head 1 is connected to the body 4, which is in the form of a tube, with the sleeve 7 of the internal assembly B axially mounted therein, connected to the clamp 2 of the cleaning gas connection. The sleeve 7 in the cylindrical part of the head 1 is shaped in the form of a bulb, inside which an openwork baffle 11 is installed transversely, acting as a mechanical filter, arresting impurities from the cleaning gas, which is directed from the connection with the clamp 2.

The sleeve of the body 4 of the external assembly A, from the connection side of the extension 5, has a threading 12 on the inner surface, matching the threading 13 made on the outer surface of the extension 5. Cooperation between these threadings allows to obtain a tight coupling of the extension 5 with the body 4, secured from the outside with a “press-fit” of the outer wall 5' of the extension 5 on the part 14 of the wall of the tube of the body 4 recessed from the outside.

Above the recess 14, the tube of the body 4 has a ring 15 secured with a flange 16. The same solution, representing the coupling of the body 4 with the extension 5 is located on the opposite side of the extension 5, connecting it with the dispensing nozzle 6.

The dispensing nozzle 6, connected to the extension 5, has in its initial section the form of a tube which constitutes a continuation of the anti-frosting gas flow channel A' with the sleeve 7 of the cleaning gas flow channel B' located inside. The dispensing nozzle widens at a certain distance from the connection point with the extension 5, turning into a flattened solid with diagonally diverging side walls 17, open at the end. The flattened surface of the dispensing nozzle 6, example 1, is horizontal to the ground.

Located in the dispensing nozzle 6, the sleeve 7 of the cleaning gas flow channel B' narrows towards point C, and then widens. Walls 18 of the cleaning gas channel B', tilted to the sides, are placed parallel to the walls 17 of the anti-frosting gas flow channel A'.

Located perpendicularly to the flared side walls 17 and 18, walls 19 and 20 form, in cross-section, closed circuits of the cleaning gas channel B' surrounded by the area of the anti-frosting gas flow channel A'. Keeping the walls of the channels A' and B' at a constant distance is ensured by fastening ribs 21 mounted between the walls 17 and 18.

An element of the lance equipment, according to the solution, example 1, is a protective, transparent cover 22, mounted on the body 4, and pressed against the flange 16 with a nut 23.

According to the invention, the lance, example 2, is made of a dielectric material and provided with an external assembly A and an internal assembly B placed therein.

The external assembly A of the lance of the cleaning kit for medium-voltage power devices, according to the solution, is a head 1 with clamps 2 and 3 of gas connections mounted in it from the front, connected to a body 4 detachably connected to an extension 5, which at the opposite end is detachably connected to a dispensing nozzle 6.

The clamp 2 is connected to the anti-frosting gas connection, while the clamp 3 is connected to cleaning gas connection.

Inside the external assembly A, an anti-frosting gas flow channel A' is formed, which is connected to the anti-frosting gas connection clamp 2, while a sleeve 7, located axially in the body 4, is a cleaning gas flow channel B' and is connected to the cleaning gas clamp 3.

The head 1 has the form of a solid of revolutions, wherein the central part of the head forms a cylinder 8 with diagonally cut walls 9 and 10 adhering to it at both ends, and the wall 9, from the side of the clamps 2 and 3, is stepped, converging towards the surface on which the clamps 2 and 3 of the connections are installed.

The head 1 is connected to the body 4, which is in the form of a tube, with the sleeve 7 of the internal assembly B axially mounted therein, connected to the clamp 2 of the cleaning gas connection. The sleeve 7 in the cylindrical part of the head 1 is shaped in the form of a bulb, inside which an openwork baffle 11 is installed transversely, acting as a mechanical filter arresting impurities from the cleaning gas, which is directed from the connection with the clamp 2.

The sleeve of the body 4 of the external assembly A, from the connection side of the extension 5, has a threading 12 on the inner surface matching the threading 13 made on the outer surface of the extension 5. Cooperation between these threadings allows to obtain a tight coupling of the extension 5 with the body 4, secured from the outside with a “press-fit”

of the outer wall 5' of the extension 5 on the part 14 of the wall of the tube of the body 4 recessed from the outside.

Above the recess 14, the tube of the body 4 has a ring 15 secured with a flange 16. The same solution, representing the coupling of the body 4 with the extension 5, is on the opposite side, connecting the extension 5 with the dispensing nozzle 6.

The dispensing nozzle 6, connected with the extension 5, has in its initial section the form of a sleeve which constitutes a continuation of the anti-frosting gas flow channel A' with the sleeve 7 of the cleaning gas flow channel B' located inside, expanding at a certain distance from the connection point with the extension 5. It turns into a flattened solid with diagonally extending side walls 17, open at the end.

The flattened surface of the dispensing nozzle 6, example 2, is angularly bent.

Placed in the dispensing nozzle 6, the sleeve 7 of the cleaning gas flow channel B' narrows towards point C, and then widens. Walls 18 of the cleaning gas channel B', tilted to the sides, are placed parallel to the walls 17 of the anti-frosting gas flow channel A'.

Located perpendicularly to the flared side walls 17 and 18, walls 19 and 20 form, in cross-section, closed circuits of the cleaning gas channel B' surrounded by the area of the anti-frosting gas flow channel A'. Keeping the walls of the channels A' and B' at a constant distance is ensured by fastening ribs 21 mounted between the walls 17 and 18.

An element of the lance equipment, according to the solution, example 2, is a protective, transparent cover 22, mounted on the body 4, and pressed against the flange 16 of a nut 23.

The invention claimed is:

1. A lance of a cleaning kit for medium-voltage power devices, wherein said lance is equipped with an external assembly and an internal assembly placed therein, wherein the external assembly comprises a head with a first clamp for connection to an anti-frosting gas, and a second clamp for connection to a cleaning gas, mounted in from a front, and a body, wherein the head is connected to the body, said body being detachably connected to an extension, said extension being detachably connected to a dispensing nozzle at an end opposite to the body;

wherein inside the external assembly there is an anti-frosting gas flow channel, connected to the first clamp, wherein the internal assembly comprises a first sleeve located axially in the body which creates a cleaning gas flow channel and is connected to the second clamp;

wherein the head has a form of a solid of revolution, and in a cylindrical part, the first sleeve is shaped in a form of a bulb, inside which an openwork baffle is installed transversely, wherein from a side of a connection with the extension, on an inner surface of the first sleeve of the body, there is a threading matching a threading on an outer surface of a tip of the extension, creating a tight coupling of the extension with the body, secured from outside with a "press-fit" fastening of an outer wall of the extension;

wherein the body, at the place of attachment, has a recess over which a ring is mounted, covered with a flange, wherein said dispensing nozzle in its initial section, near the extension, has the form of a second sleeve, which at a certain distance from the place of connection with the extension turns into a flattened solid with side walls diagonally diverging to the sides, and is open at an end, wherein inside the dispensing nozzle there is a third sleeve which constitutes a continuation of the cleaning gas flow channel which the second sleeve narrows towards a point and then widens, wherein said widening walls of the third sleeve run parallel to the diverging walls of the second sleeve, and wherein the flattened surface of the dispensing nozzle is angularly bent, forming angularly bent walls, and wherein the angularly bent walls are perpendicular to the second sleeve and the third sleeve, in cross-section, and form a closed circuit of the cleaning gas flow channel surrounded by an area of the anti-frosting gas flow channel.

2. The lance according to claim 1, comprising a protective cover mounted on the body, and pressed against the flange with a nut.

3. The lance according to claim 1, wherein a central part of the head is formed by a cylinder with diagonally cut walls at both ends, wherein the wall, from a side of the first clamp and the second clamp is stepped, converging towards the inner surface with the first clamp and the second clamp installed thereon.

4. The lance according to claim 1, wherein the openwork baffle is a mechanical filter of impurities in a cleaning gas.

5. The lance according to claim 1, made of a dielectric material.

6. The lance according to claim 1, wherein the dispensing nozzle at the end is parallel to ground or angularly bent.

* * * * *